May 13, 1952 R. W. JOHNSON ET AL 2,596,409
SOLENOID GAS VALVE
Filed March 14, 1947

INVENTORS
ROY W. JOHNSON
CEDRIC E. ZARWELL
LOURDES V. McCARTY
By John W. Michael
ATTORNEY Patented May 13, 1952

2,596,409

UNITED STATES PATENT OFFICE 2,596,409

SOLENOID GAS VALVE

Roy W. Johnson, Cedric E. Zarwell, and Lourdes V. McCarty, Milwaukee, Wis., assignors to A P Controls Corporation, a corporation of Wisconsin Application March 14, 1947, Serial No. 734,836

4 Claims. (Cl. 137—139)

This invention relates to improvements in electric solenoid operated valves for controlling flow of fluids and particularly to the type of valve in which the solenoid armature acts in a body of the fluid to be controlled.

The class of solenoid valves to which the present invention relates is generally shown in Patent 2,222,419, McCarty, November 19, 1940, but may be operated either with alternating or direct current. The solenoid armature is movable within a well open at one end to the fluid to be controlled and has a chamber therein receiving a spring for supporting a stem relatively movable in and with respect to the armature and extending therefrom. The extending end of the stem bears a valve member and the entire movable sub-assembly of the structure is surrounded by and movable in a body of liquid to be controlled. Solid particles in the fluid and readily passing through the valve or other precipitable materials carried by the fluid may thus deposit on and between the relatively movable elements and interfere with the free movements thereof. Such interference between the moving elements can be minimized if the moving elements are enclosed within a flexible member which is porous or permeable to the fluid to be controlled but filtering out solids and causing the depositing of other precipitable materials on the flexible member. However, even when such member is new, movement of the armature and valve are retarded by displacement of fluid which must flow into or out of the member through the wall thereof or by way of a special passage, such dashpot effect increasing as the openings in the flexible member become filled with solids. Hence, it is necessary that the valve movement be relatively slow and that the energy of the magnetic flux be stored during the movement of the armature and released by the storage means to the valve as the dashpot action allows the valve to move.

It is, therefore, one object of the present invention to retain a body of only permanently fluid material about the moving elements of a solenoid operated valve, the content of such fluid body being changed only by displacement of a portion of such body as a result of movement of the valve.

Another object of the invention is to provide means preventing the entrance of solid particles in a fluid, into the space about the moving elements of a solenoid operated valve and to retain substantially a constant volume of only the permanently fluid material about such elements.

Another object of the invention is to provide a solenoid operated valve of the type in which the valve member and its operating mechanism acts in a body of the fluid to be controlled, with means for filtering precipitable material out of the fluid before the fluid contacts the valve member operating mechanism.

A further object of the invention is to provide an inclosed universally movable joint between the armature of a solenoid operated valve and the valve member itself, the enclosure being porous and permeable to the fluid to be controlled but preventing access of depositable materials to the interfitting joint surfaces.

And a further object of the invention is to adapt movement of the elements of a solenoid operated valve to such rate as will minimize the dashpot effect of enclosing such elements in a member permeable only to the permanently fluid portions of the material to be controlled by the valve.

Objects and advantages other than those above set forth, will be apparent from the following description when read in connection with the accompanying drawing, in which.

Figure 1:
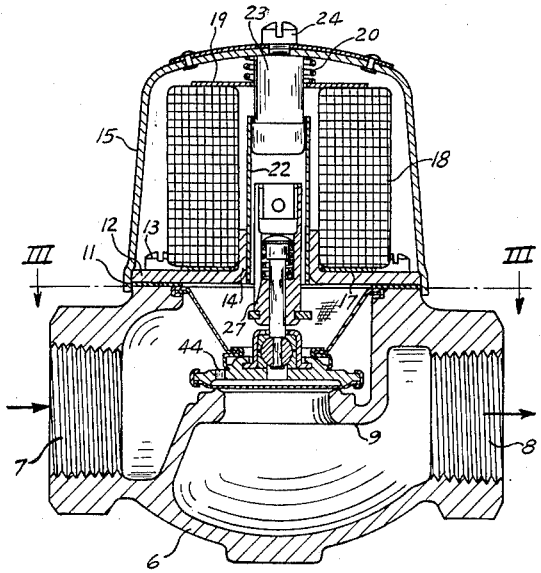
Fig. 1 is a vertical sectional view on substantially a central longitudinal plane through a solenoid actuated valve embodying the present invention.

Referring particularly to the drawings, reference numeral 6 generally designates a casing with an inlet 7 and an outlet 8 which are internally screw threaded for the connection thereto of fluid conveying conduits (not shown). The casing is substantially divided into two chambers by a partition 9 with an aperture therethrough and the outer wall of the casing has an aperture through which the valve member and its operating mechanism may be placed in the casing.

The aperture in the casing wall is rabbeted about one edge of its inner periphery for a purpose appearing hereinafter and the outer surface of the casing wall about the aperture, is made plane to receive a suitable gasket 11 on which is placed a base 12 for enclosing parts to be described, the base being secured on the casing by screws 13 threaded into the casing. The base 12 has an aperture axially alined with the aperture in the casing partition 9 and defined by a flange 14 extending into the space between the base and a cover 15 removably fitted on the base. A washer 17 of electrical insulating material is laid on the base 12 about the flange 14 to serve as a seat for an electrically conductive coil 18 with a central passage therethrough fitting over the base flange 14 which holds the coil against radial displacement. An annular plate 19 of electrical insulating material is laid on the upper end of the coil and a helical spring 20 acts between such plate and the cover 15 to hold the coil against axial displacement. Suitable electrical conductors (not shown) are connected with the ends of the coil and extend through the cover to a source of electric current.

A tube 22 of non-magnetic material is fitted in fluid-tight relation in the base aperture flange 14 and extends into the passage through the coil 18. The end of the tube within the coil is closed in fluid-tight relation by a plug 23 extending from the tube into contact with the cover 15 and the plug is held in position by a screw 24 extending through the cover into the plug. The space within the cover and about the coil is thus sealed off from the path of fluid flow and may be open to atmosphere or closed as desired.

A reciprocatable core or plunger generally designated 27 is the armature for the coil and thus completes the solenoid structure. The armature 27 is freely slidable into tube 22, being preferably hexagonal in transverse cross section to keep the armature centered in the tube while providing free movement of fluid in the tube and about the armature. The armature is of magnetic material and is substantially tubular on two different internal diameters to provide a relatively large interior space with an internal shoulder at the junction of such space with a relatively small diameter passage from the space through the end of the armature. A tubular shading coil 28 is mounted in the end of the larger space in the armature and receives a stop 29, both the shading coil and the stop being held in place by a pin 30. The shading coil functions as is well known to cause a lag in the flux when the coil is energized with alternating current and thus maintains the magnetic effect of the coil on the armature when the electrical current alternations pass through zero. Another stop 31 which is non-magnetic, is fitted in and extends laterally outward from the armature for engagement with the base 12 to limit movement of the armature into the coil tube 22. The armature is preferably slotted to minimize the heating effect of eddy currents as is well known.

A stem generally indicated at 35 and preferably of non-magnetic material, is formed with a rounded and flanged head 36 movably fitting in freely slidable relation in the larger space in the armature and with a body portion 37 extendable through and freely movable in the small diameter passage in the armature. A helical spring 38, also preferably of non-magnetic material, seats between the shoulder in the armature and the flange on the stem head to permit relative movement of the armature and stem. The spring stores energy during movement of the armature in the range of maximum action of the coil on the armature and releases such energy to stem 35 and its valve member.

The valve member comprises a backing plate 42 on which is mounted a flexible and resilient disc-like member 43 constituting the portion of the valve member co-acting with the seat about the aperture through the valve casing partition 9 and thus controlling the flow of fluid through the valve. The back plate 42 has an aperture at 44 to equalize the pressure between the plate and the valve disc with the pressure above the plate and such aperture performs another function as will be described. The disc is retained on the back plate by a ring 45 flanged over the edges of the plate and one surface of the back plate has a circular rib 46 formed thereon to space the valve disc from the back plate and to insure sealing of the disc 43 on the seat about the aperture through the casing partition 9. The back plate has a flanged cavity on one side thereof to receive a shell 48 in which are fitted rings 49 shaped to co-act in defining a substantially cylindrical cavity when mounted in the shell. A ball 50 is fixed on the end of stem 35 and fits into the cavity defined by the rings to form therewith a ball and a socket joint allowing universal movement of the valve member relative to the stem. It will be understood that the ball is freely movable in the socket and that passages are therefore provided through which fluid may flow from and into the space between plate 42 and disk 43 and from such space through aperture 44.

One surface of the back plate 42 is provided with an undercut portion forming a flange-like projection 54 under which is engaged one edge of a ring 55 having the other edge suitably formed to receive and hold one end of an inclosing member 56 of flexible and permeable material such as a textile not affected by the fluid to be controlled and which is in the nature of a screen. The other end of the screen 56 is held in ring 57 of such diameter as to fit in the rabbet about the valve casing wall aperture and to be sealed therein by the gasket 11. Such screen may be tubular or frusto-conical or otherwise shaped to provide dimensions permitting attachment of the screen edges as above described while providing sufficient space within the screen to accommodate the valve operating parts even when the screen is collapsed. It will be understood that the screen mesh is so small as to prevent the penetration therethrough of any solid materials in the fluid to be controlled and to secure the depositing thereon of any precipitable materials in such fluid. The screen is flexed as the valve mechanism moves thus tending to dislodge materials precipitated thereon and to keep the screen clean.

The two rings 55 and 57 are sealed in fluid relation respectively with the valve back plate and into valve casing so that all fluid passing into the space in and about the armature-stem mechanism must pass through the screen 56 or through the spaces in the ball and socket joint. Hence, there can be no interference by solids with relative movement of the armature and the stem and the valve as a whole can be kept in the best possible operating condition merely by replacing the screen if and when such screen becomes impervious and non-flexible. It will be understood that screen 56 may be made impervious to the fluid if an opening of suitable size is made through the screen to allow displacement of fluid therein without passage through the screen or the universal joint. Such opening may however pass solids and will not be practical in some cases. The flexible and resilient valve disk provides a fluid pressure seal on the valve seat while allowing some movement of the valve operating mechanism in both directions before the valve is unseated. And, the universal joint between the back plate and stem eliminates the possibility of binding the armature in the well or of binding the stem in the armature even though the valve seat is not perpendicular to the axis of the well.

The operation of the present structure differs from that of the usual solenoid valve for the reason that displacement of fluid upon armature and valve movement is no longer freely possible. Such movement of the armature and the valve as decreases or increases the volume of the space within the enclosed member, displaces fluid which must pass through the enclosing member or through the ball and socket joint spaces. A dashpot effect is therefore obtained which increases approximately at the same rate as the screen apertures become permanently clogged. Hence the present armature is specially designed to operate properly in spite of such dashpot effect, by storing energy during a portion of the armature and valve movement and releasing such energy during the remainder of the armature movement thus avoiding waste of energy in moving fluid rapidly into and out of the enclosed space. The desired result can be obtained by balancing the magnetic action of coil 18 on armature 27 with the force of spring 38 and the fluid pressure on the valve to obtain a solenoid pull greater than the resistance of spring 38, throughout the entire armature movement and such pull is opposed by the spring 38 until the head of the stem 35 engages stop 29. The spring force then coacts with the solenoid pull to overcome the pressure on the valve and the resistance to displacement of the fluid remaining within the enclosed member 56. It will thus be seen that the present armature structure is particularly adapted to secure such action of the moving elements of the armature and the valve as to minimize the dashpot action thereon resulting from enclosing such elements in means restricting flow of fluid to and from the enclosed space and about such elements. If the present armature structure is not used, in a valve structure such as herein disclosed, the solenoid as a whole must be made sufficiently large to overcome both the resistance of the valve to movement and the resistance of the enclosed fluid to displacement.

Figure 4:
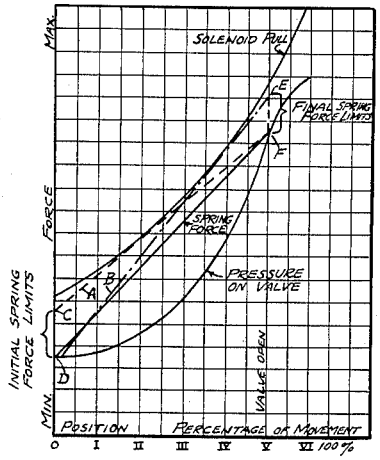
Fig. 4 is a diagram showing the relationship of the forces acting in such structure and the limit values of such forces.
Figure 2:
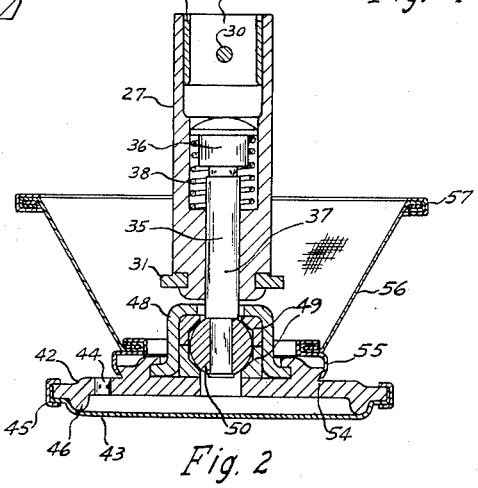
Fig. 2 is an enlarged vertical sectional view of the valve and of the operating mechanism thereof.
Figure 3:
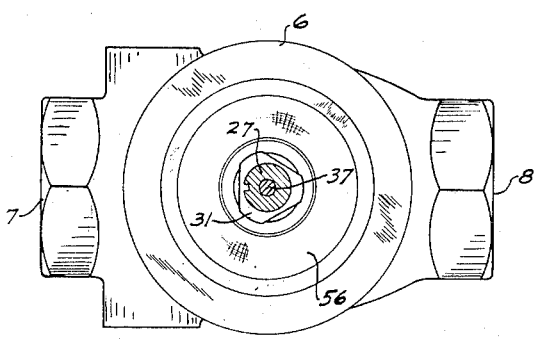
Fig. 3 is a sectional view taken on the plane III—III of Fig. 1.

The action of the several forces is shown in Fig. 4 of the drawing in which the curve labeled "solenoid pull" is the force exerted on the plunger by the solenoid as the plunger rises. (Forces acting in a direction which would open the valve are considered positive and forces tending to close the valve are considered as being negative in Fig. 4.) The curve designated "pressure on the valve" is a force tending to close the valve (the force is actually negative—hence, the curve shown is a reflection above the zero axis of the true curve). The curve marked "spring force" is the force of the spring 38 and is in fact two curves, the first in time being negative while the plunger is travelling during the initial portion of its stroke and is storing its energy in the spring, the second in time being positive while the spring is giving up its energy to the valve. When the valve stem head contacts the shoulder of the plunger at position V, the pull on the plunger, as indicated by the curve "solenoid pull", is greater than the force required to open the valve—that is, the curve "solenoid pull" is higher in value than the curve "pressure on the valve." Therefore, the plunger continues to move and rises for the remainder of its travel.

Curves A and B show the limits within which the spring force may be varied. The point C is the maximum value and the point D is the minimum value that the spring force may have initially to secure the described operation of the valve. The points E and F are the maximum and minimum, respectively, of the final spring force needed to secure the described operation of the valve. The point D is the lowest value of "pressure on the valve." The point F is the intersection of the "valve open" line with the pressure on the valve curve. The point C is determined by drawing a straight line A from the point F tangent to the curve "solenoid pull", and the point E is determined by drawing a straight line B from the point D tangent to the curve "solenoid pull."

Although but one embodiment of the present invention has been illustrated and described, it will be apparent to those skilled in the art that various changes and modifications may be made therein without departing from the spirit of the invention or from the scope of the appended claims.

We claim:

1. A valve having a casing provided with inlet and outlet ports, a valve seat between the ports, a solenoid mounted on the casing, an armature on the casing operated by the solenoid, valve means adapted to cooperate with the seat to regulate flow through the casing, a porous member connected to the valve means and to the casing to enclose the armature to filter the fluid contacting the armature, the degree of porosity of said member being such as to inhibit the free flow of fluid therethrough and to create a dash-pot action when the valve is moved, and means operatively connecting the valve means to the armature for movement thereby when the solenoid is energized, said solenoid, when the valve is in service, being incapable of moving the valve and associated porous member due to said dash-pot action, said connecting means between the valve and armature including means permitting relative differential movement therebetween when the solenoid is energized and means for storing energy during a portion of the movement of the armature relative to the valve, the energy so stored being sufficient when released to move the valve and associated porous member.

2. A valve having a casing provided with inlet and outlet ports, a valve seat between the ports, a solenoid mounted on the casing, an armature on the casing operated by the solenoid, valve means adapted to cooperate with the seat to regulate flow through the casing, a porous member connected to the valve means and to the casing to enclose the armature to filter the fluid contacting the armature, the degree of porosity of said member being such as to inhibit the free flow of fluid therethrough and to create a dash-pot action when the valve is moved, lost motion means operatively connecting the valve means and the armature for raising the valve from its seat when the solenoid is energized, said solenoid, when the valve is in service, being incapable of moving the valve and associated filter member due to said dash-pot action, to permit of differential movement therebetween when the solenoid is energized, said solenoid, when the valve is in service, being incapable of moving the valve and associated porous member due to said dash-pot action, and means operable in response to such differential movement to store energy during a portion of the armature movement relative to the valve, the energy so stored being sufficient when released to move the valve and associated porous member.

3. A valve having a casing provided with inlet and outlet ports, a valve seat between the ports, a solenoid mounted on the casing, an armature on the casing operated by the solenoid, valve means adapted to cooperate with the seat to regulate flow through the casing, a porous member connected to the valve means and to the casing to enclose the armature to filter the fluid contacting the armature, the degree of porosity of said member being such as to inhibit the free flow of fluid therethrough and to create a dashpot action when the valve is moved, means operatively connecting the valve means and the armature and permitting of differential movement therebetween when the solenoid is energized, said solenoid when the valve is in service being incapable of moving the valve and associated porous member due to said dash-pot action, said connecting means including spring means acting between the valve means and the armature to store energy during a portion of the armature movement relative to the valve, the energy so stored being sufficient when released to move the valve and associated porous member.

4. A valve having a casing provided with inlet and outlet ports, a valve seat between the ports, a solenoid mounted on the casing, an armature on the casing operated by the solenoid, a valve having a stem and being adapted to cooperate with the seat, a filter connected to the valve and to the casing to enclose the armature and prevent foreign matter from contacting the armature, the degree of porosity of said filter member being such as to inhibit the free flow of fluid therethrough and to create a dash-pot action when the valve is moved, a lost motion connection between the stem and the armature for raising the valve from its seat when the solenoid is energized, said solenoid, when the valve is in service, being incapable of moving the valve and associated filter member due to the said dashpot action, and a spring acting in said lost motion connection to store energy during a portion of the armature movement relative to the valve stem, the energy so stored being sufficient when released to raise the valve from its seat together with the associated filter member.

ROY W. JOHNSON.
CEDRIC E. ZARWELL.
LOURDES V. McCARTY.

REFERENCES CITED

The following references are of record in the file of this patent:

UNITED STATES PATENTS

| Number | Name | Date |
|---|---|---|
| 912,866 | Massa | Feb. 16, 1909 |
| 959,618 | Schmidt | May 31, 1910 |
| 1,128,426 | Dunham | Feb. 16, 1915 |
| 1,271,670 | Conrad | July 9, 1918 |
| 2,031,478 | Gray | Feb. 18, 1936 |
| 2,299,654 | Ray | Oct. 20, 1942 |
| 2,357,013 | McKinnis | Aug. 29, 1944 |
| 2,358,828 | Ray | Sept. 26, 1944 |
| 2,360,945 | Garner | Oct. 24, 1944 |
| 2,382,664 | Ray | Aug. 14, 1945 |